United States Patent [19]

Michellone et al.

[11] 4,057,300
[45] Nov. 8, 1977

[54] MOTOR VEHICLE BRAKING SYSTEM

[75] Inventors: Giancarlo Michellone, Cambiano (Turin); Virginio Maggioni, Rosta (Turin), both of Italy

[73] Assignee: FIAT Societa per Azioni, Turin, Italy

[21] Appl. No.: 732,224

[22] Filed: Oct. 14, 1976

[30] Foreign Application Priority Data

Oct. 31, 1975 Italy .................................. 69706/75

[51] Int. Cl.$^2$ .............................................. B60T 8/04
[52] U.S. Cl. ..................................... 303/113; 303/119
[58] Field of Search ............. 188/181 A; 303/80, 113, 303/119

[56] References Cited

U.S. PATENT DOCUMENTS

| 3,677,610 | 7/1972 | Pauwels et al. | 303/113 |
| 3,767,273 | 10/1973 | Peruglia | 303/119 |
| 3,976,335 | 8/1976 | Sekiguchi | 303/113 |
| 3,977,734 | 8/1976 | Rönnhult et al. | 303/119 |

Primary Examiner—Duane A. Reger

Attorney, Agent, or Firm—Sughrue, Rothwell, Mion, Zinn, and Macpeak

[57] ABSTRACT

A fluid operated braking system for a motor vehicle, having a main braking circuit for applying braking pressure to the actuators of both wheels of at least one axle of the vehicle, and a subsidiary braking circuit for applying a reduced braking pressure to one of the wheels of the axle if it should enter a skid or incipient skid state, in which the subsidiary braking circuit is controlled by two distributors each of which is associated with a respective wheel and has three ports, one connected to the main braking circuit, one connected to the subsidiary braking circuit, and one connected to the brake actuator of the associated wheel of the axle, the distributor being controlled by an electrovalve to connect the main braking pressure circuit to the brake actuator of the associated wheel of the axle under normal braking conditions, and to connect the subsidiary braking circuit, through an internal path within the distributor, to the brake actuator of the associated wheel of the axle if this wheel enters a skid or incipient skid state, without affecting the distributor associated with the other wheel of the axle.

5 Claims, 6 Drawing Figures

MOTOR VEHICLE BRAKING SYSTEM

The present invention relates to a motor vehicle braking system, and particularly to a braking system having means for detecting when any wheel of the vehicle enters a skid or incipient skid state upon braking and reduces the braking pressure on that wheel while transmitting full braking torque to the non-skidding wheels of the vehicle.

Known braking systems of this type include means for applying braking pressure to brake actuators of both wheels of an axle for simultaneous braking of the two wheels of the said axle, and means for applying a reduced braking pressure to one of the wheels of the axle if its dynamic state approaches a skid or incipient skid state, while continuing to apply the full braking pressure to the other wheel of the axle if it is not in a skid or an incipient skid state. These braking systems also include electrically controlled distribution means, associated with each of the two wheels of the axle, which are in series with the main braking circuit of the system. Because of this the distribution means must have ports and passages equal in size to those of the main brake pipe so as not to cause delays in braking when the system is operating normally; furthermore, the distribution means must also be provided with an electrical control device of considerable power and size.

The present invention seeks to provide a braking system of the same general type as that described above, in which the electrically controlled distribution means associated with each of the two wheels of the axis, have control ports and passages of smaller dimensions than the conduits of the main braking circuit and which, therefore, require less power for their operation than conventional devices known in the art.

According to the present invention, there is provided a fluid operated motor vehicle braking system for at least two wheels of one axle of the vehicle, of the type comprising: means for applying braking pressure to brake actuators of both wheels of the said axle for simultaneous braking of the two wheels of the said axle, and means for applying a reduced braking pressure to one of the wheels of the axle if it enters a skid or incipient skid state, while continuing to apply the full braking pressure to the other wheel of the axle if it is not in a skid or an incipient skid state, including respective electrically controlled distribution means associated with each of the two wheels and each comprising an electrovalve linked to a distributor having a first port to which is connected a circuit including a main source of braking pressure, a second port to which is connected a brake pipe leading to the brake actuator of an associated wheel, and a third port to which is connected a conduit leading to an auxiliary source of braking pressure, the distributor also having a main chamber in which is slidingly housed a main valve shutter which separates the main chamber into first and second compartments, the first compartment communicating with both the first and second ports, and the second compartment communicating via a communication passage within the distributor with the electrovalve which also communicates with the said third port, the electrovalve having a valve shutter which closes communication between the said third port and the said second compartment of the main chamber when the electrovalve is in a first operating position, and which opens such communication when the electrovalve is in a second operating position, the said main shutter being displaced by pressure in the said second compartment when the electrovalve is in the second operating position to close communication between the said first and second ports and to open communication between the said third and second ports.

Two embodiments of the invention will now be more particularly described by way of example, with reference to the accompanying drawings, in which.

Figure 1:
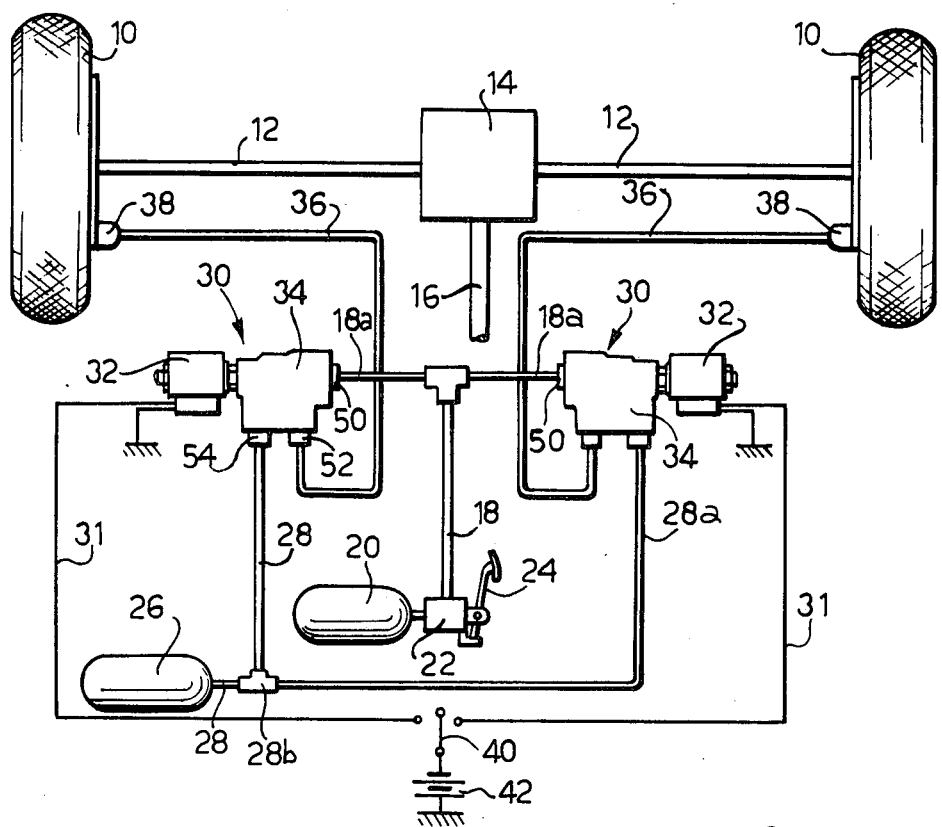
FIG. 1 is a schematic diagram illustrating a motor vehicle braking system formed as a first embodiment of the present invention.

Referring now to the drawings, and particularly to FIG. 1, there is shown a braking circuit for two driving wheels 10 of one axle (indicated 12) which are driven through a differential gear 14 from a transmission shaft 16.

A main compressed air reservoir 20 feeds a control valve 22 which is controlled by a pedal 24 operable by the driver of the vehicle. Upon depression of the brake pedal 24 compressed air is fed through the valve 22 into a main brake pipe 18 which communicates with two branch pipes 18a. Each of the branch pipes 18a feeds a respective distribution device 30.

Each of the distribution devices 30 comprises a distributor 34 controlled by an electromagnetically operated valve 32, hereinafter termed an electrovalve. The electrovalves 32 are connected by wires 31 to a two pole switch 40 which has a neutral position and two operated positions in which it feeds one or other of the electrovalves 32 with current from a source 42 illustrated as a battery. The distributors 34 have three ports, a first port 50 to which is connected the pipe 18a fed from the valve 22 operated by the brake pedal 24, a second port 52 to which is connected a brake pipe 36 leading to a brake actuator 38 of a respective wheel 10, and a third port 54 to which is connected a pipe 28a connected at a T-junction 28b to a pipe 28 leading from an auxiliary compressed air reservoir 26.

Figure 2:
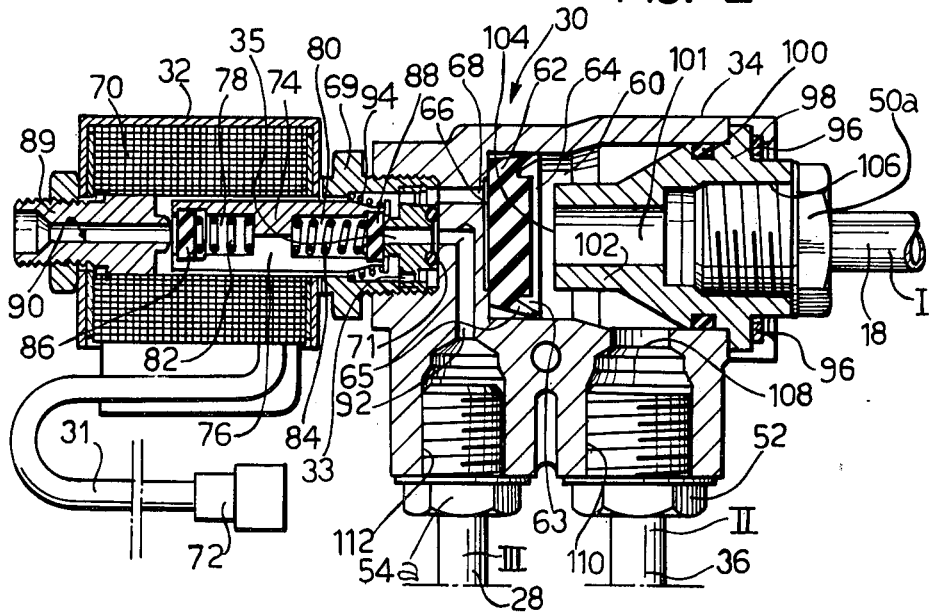
FIGS. 2 and 3 are longitudinal sections through a first distributor suitable for use in the braking systems of FIG. 1, showing the distributor in two different operating positions.
Figure 3:
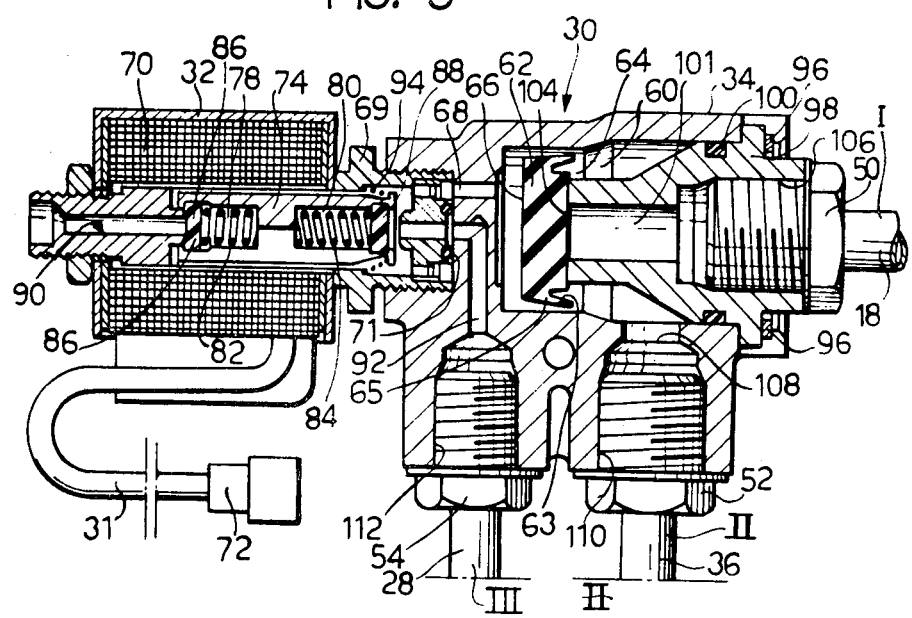

One of the distribution devices 30, which are both identical, is shown in FIGS. 2 and 3.

Referring now to FIGS. 2 and 3 the distributor 34 is formed by a body of die-cast aluminium alloy defining a main chamber 60 within which slides a main valve shutter 62 which separates the main chamber 60 into a first compartment 64 and a second compartment 66. The first compartment 64 is open at one end and the opening is closed by a pipe connector defining the first port 50 of the distributor. The pipe connector comprises a threaded socket insert 98 fixed to the body 34 by means of bolts 96 and sealed in the opening in the first compartment 64 of the main chamber by a sealing ring 100. The socket insert 98 has a central longitudinal through hole 101 and is substantially in the form of a truncated cone, from the smaller end of which extends a coaxial projection 102 against the end of which the valve shutter 62 can press to close the mouth of the hole 101 thereby shutting off the first port 50. At the larger end of the socket insert 98 the hole 101 has a threaded part 106 into which is screwed a connector union 50a which attaches the pipe 18 to the distributor for communication therewith. This constitutes the first port 50. In the body 34, and extending orthogonally with respect to the longitudinal axis of the socket insert 98, there is a threaded hole 110 communicating via a passage 108 with first compartment 64 of the main chamber 60. Screwed into the threaded hole 110 is a connector union 52a which attaches the pipe 36 to the distributor 34 for communication therewith. This constitutes the second port 52.

Parallel to the hole 110 in the body 34 there is a further threaded hole 112 into which is screwed a connector union 54a to secure the pipe 28 to the body of the distributor 34. This constitutes the third port 54. The hole 112 communicates with a passage 92 leading to an electrovalve 32.

The second compartment 66 of the main chamber 60 also communicates, through a passage 68, with the electrovalve 32. The cross-sectional area of the passage 68 is equal to approximately 1/15 of that of the cross-sectional area of the brake pipes 18 and 36.

The electrovalve 32 has a threaded boss 69 which is screwed into a threaded cavity in the body of the distributor 34, into which cavity open both the passage 68 communicating with the second compartment 66 of the main chamber 60 and the passage 92 leading to the third port 54. The threaded boss of the electrovalve 32 has two axial passages 33, 35 which respectively communicate with the passages 68 and 92 within the distributor 34. The end face of the boss has a sealing ring 71 surrounding the mouth of the passage 35 to prevent leakage from the junction of the passages 35 and 92.

The electrovalve 32 has an energising winding 70, fed through a cable 31, provided with a connector 62 for electrical connection to the switch 40. Within the winding 70 is a movable core 74 of cylindrical form, provided with a longitudinal notch 76 and two cavities 78 and 80 one in each end of the core. The cavities 78, 80 house springs 82, 84 over which are fitted respective disc-type valve shutters 86, 88 which are urged axially towards respective ends of the core 74 by the springs 82 and 84.

The end of the electrovalve 32 remote from the threaded boss which is screwed into the distributor 34 is closed by a plug 89 having a through hole 90 the mouth of which is covered by the shutter 86 when the electrovalve is energised but which permits communication with the atmosphere when the electrovalve is de-energised. The core 74 of the electrovalve 32 is biased by a spring 94 towards the distributor 34 so that the shutter 88 is pressed over the mouth of the passage 35 thereby closing the passage 92 leading to the third port 54. In the de-energised position of the electrovalve 32, as illustrated in FIG. 2, the passage 68 of the distributor is in communication with the atmosphere through the longitudinal notch 76 of the core 74, and the hole 90 in the plug 89.

The main shutter 62 is made of resilient material, in the form of a flattened truncated cone the larger and smaller end faces of which respectively face the said first compartment 64 and the second compartment 66. In the large end face of the main shutter 62 is an annular groove 63 which defines a peripheral resilient sealing lip 65.

The device described above operates as follows:

In FIG. 2 the electrovalve is shown de-energised: this corresponds to normal conditions in which the brake actuator 38 of the associated wheel 10, is directly supplied from the main braking circuit 18 when the pedal 24 is depressed.

In these conditions compressed air from the main reservoir 20 is fed through the valve 22 controlled by the brake pedal 24 along the brake pipe 18, through the hole 101 of the connector socket 98 of the first port 50 and into the first compartment 64 of the main chamber 60. The main shutter is pressed over the mouth of the passage 68, closing this passage. The pressure being weaker in the first compartment 64 than in the second compartment 66, tends to open the lip 65 pressing this firmly against the walls of the main chamber 60. The pressure in the first compartment of the main chamber 60 is thus only fed through the second port 52 to the brake pipe 36 and from there to the brake actuator 38 of the associated wheel. The passage 92 is closed by the electrovalve 32 and thus compressed air from the auxiliary reservoir 26 cannot enter the distributor 34.

If the associated wheel 10 should enter a skid or incipient skid state this is detected by means (not shown) which throw the switch 40 in the appropriate direction to energise the winding 70 of the electrovalve 32. The energising of the winding 70 causes retraction of the core 74 and the disc-type valve shutter 86 at the end of the core thus closes the mouth of the hole 90 communicating with the atmosphere. The disc-type shutter 88 at the other end of the core 74 is lifted away from the mouth of the passage 92 opening communication between this and the passage 68 leading to the second compartment of the main chamber 60. The main shutter 62 is now pressed by the increase in pressure in the second compartment 66 against the mouth of the hole 101 closing the first port 50. The pressure difference across the two compartments is now in the opposite sense from the previous conditions, pressure being higher in the second compartment 66 than in the first compartment 64; this deforms the radial lip 65 of the main shutter 62 inwardly allowing compressed air to flow from the second compartment into the first compartment thereby opening communication between the third port 54 and the second port 52. The pressure now applied to the brake actuator 38 from the auxiliary reservoir 26 starts at a low value and rises slowly due to the small cross-sectional area of the passages 68 and 92, and due to the resistance of the resilient lip 65 to the passage of air from the second into the first compartment of the main chamber 60.

When the wheel 10 which was in a skidding condition returns to a normal dynamic state the electrovalve 32 is de-energised, thus causing the anti-skid action to cease and restoring the distributor 34 to the initial conditions in which the passage 92 is closed by the shutter 88 of the electrovalve 32 and the passage 68 is in communication with the atmosphere; the main shutter 62 is displaced by the pressure difference across the two compartments of the main chamber 60 reopening the hole 101 of the connector socket 98 of the first port 50.

Figure 4:
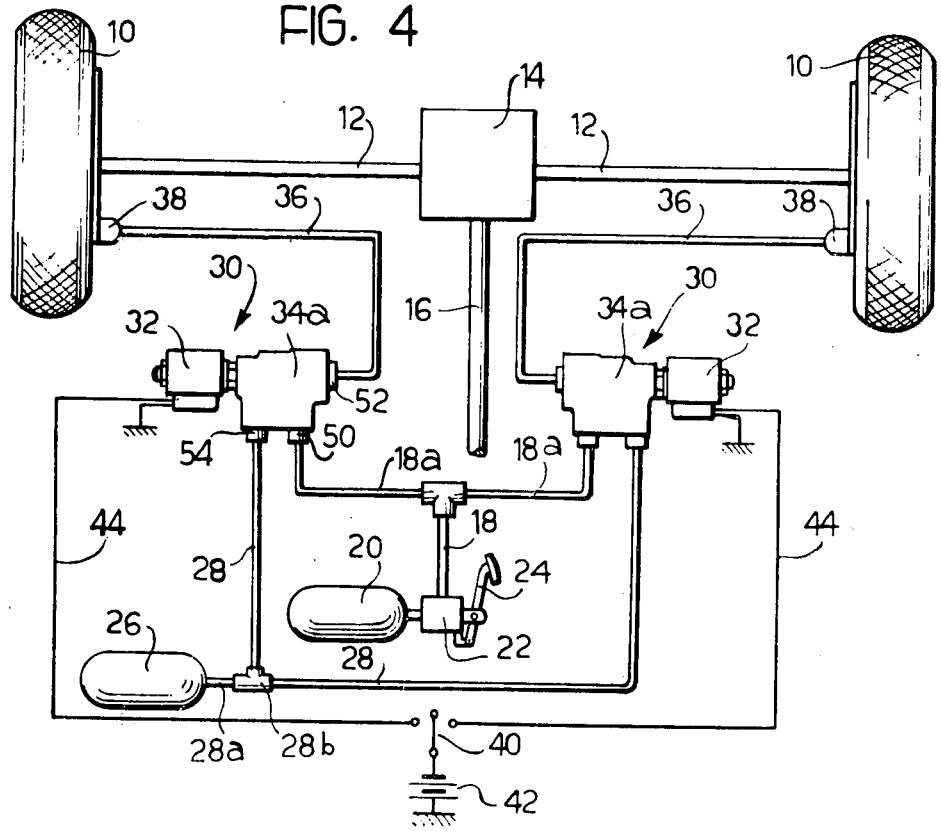
FIG. 4 is a schematic diagram of a motor vehicle braking circuit similar to that of FIG. 1, but differing in the form of the distributors.

Referring now to FIG. 4 the braking system shown is substantially the same as the embodiment of FIG. 1, but the distributors 34a are different from the distributors 34 of the embodiment of FIG. 1.

Figure 5:
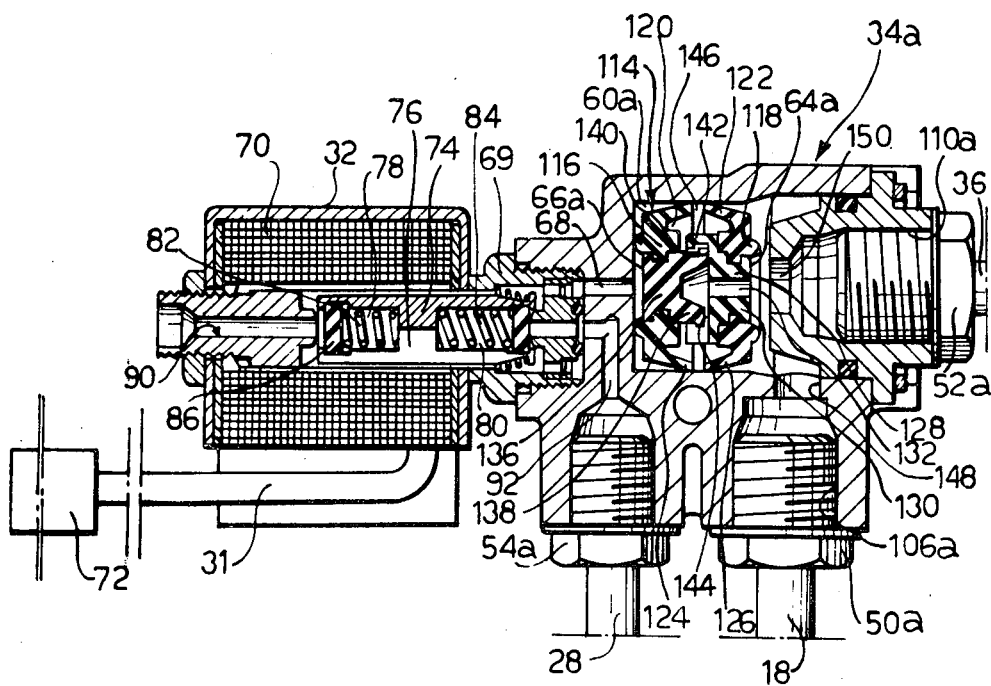
FIGS. 5 and 6 are longitudinal sections of a second distributor suitable for use in the braking system of FIG. 4, respectively showing the distributor in two different operating positions.
Figure 6:
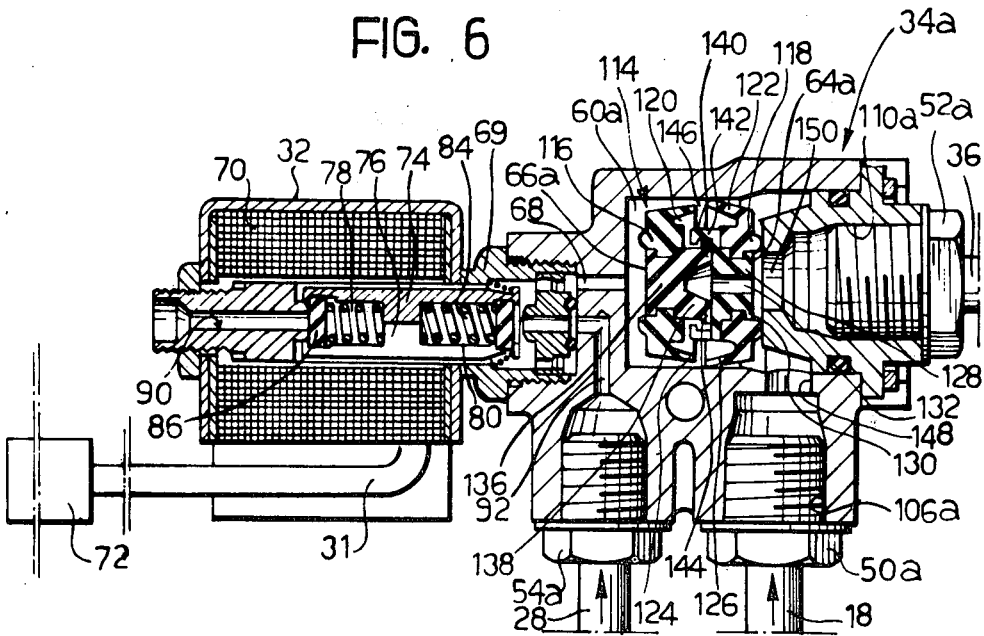

Integers of the embodiment of FIGS. 4, 5 and 6 which are identical to those illustrated in FIG. 1, or which fulfil the same functions, are indicated with the same reference numerals.

The differences between the distributor 34a illustrated in FIGS. 5 and 6 and the distributor 34 illustrated in FIGS. 2 and 3 are that the threaded holes 106a and 110a which constitute respectively the first and second ports 50 and 52, are in reversed positions with respect to the positions of the holes 106 and 110 of the first and second ports 50, 52 of the distributor 34. Furthermore, the distributor 34a is provided with a main chamber 60a which is substantially larger than the main chamber 60 of the distributor 34, and this main chamber 60a houses a composite main shutter 114.

The composite main shutter 114 is formed by first and second shutter parts 118, 116 each in the form of a rather flat truncated cone. The two shutter parts 116 and 118 have their larger end faces facing each other and are each provided with an annular groove 120, 122 in the larger face, which grooves define respective peripheral lips 124 and 126. The two shutter parts 116, 118 define between them a central space 146.

The composite main shutter 114 separates the main chamber 60a into two compartments 64a and 66a, the first part 118 of the composite shutter forming one wall of the first compartment 64a and the second part 116 of the composite shutter 114 forming one wall of the second compartment 116 of the main chamber 60a. The first shutter part 118 has an axial aperture 128 in which is fixedly housed a core 130 provided with a central axial hole 132. The second main shutter part 116 is provided with an axial aperture 136 in which is housed a blank core 138 which has axial projections 140 which interengage with corresponding projections 142 of the apertured core 128 of the first main shutter part 118. The core 138 has a radial passage 144 which allows communication between the central axial aperture 132 of the core 128 and the space 146 between the two main shutter parts 116 and 118.

The end of the brake pipe 18 is held in the threaded hole 106a which constitutes the first port 50 by the connector union 50a, and a passage 148 communicates between the first compartment 64a of the main chamber 60a and the threaded hole 106a.

The device shown in FIGS. 5 and 6 operates as follows: when the electrovalve 32 is de-energised the air from the main reservoir 20 passing along the brake pipe 18 passes through the passage 148 into the first compartment 64a of the main chamber 60a, and from there passes through a passage 150 into the threaded hole 110a which constitutes the second port 52 to which is connected the brake pipe 36 leading to the brake actuator 38 of the associated wheel 10. The composite shutter 114 is pressed over the mouth of the passage 68, and the compressed air passing through the hole 132 of the apertured core 128, causes a tendency toward radially outward deformation of the lip 124 such as to press this firmly against the wall of the main chamber 60a and prevent the possibility of any air passing from the main chamber 60a into the passage 68. In these operating conditions the electrovalve 32 is de-energised and, as in the embodiment of FIGS. 2 and 3, closes the passage 92 by means of the disc-type shutter 88.

In FIG. 6 the distributor 34a is shown with the electrovalve 32 energised, in which condition the outlet hole 90 is closed and the passage 92 can communicate with the passage 68. Compressed air from the auxiliary reservoir 26 fed along the brake pipe 28, can thus enter the second compartment 66a of the main chamber 60a. The composite shutter 114 is pushed by the increased pressure in the second compartment against the mouth of the passage 150 to cut off the communication between the brake pipe 18a and the brake pipe 36.

Compressed air in the second chamber deforms the resilient lip 124 radially inwardly and flows into the space 146 between the two main shutter parts 116 and 118. From there it passes through the said opening 144 and the aperture 132, and finally enters the pipe 36 through the passage 150 and the hole 110a constituting the second port 52. The compressed air in the space 146 also deforms the lip 126 of the first shutter part 118 radially outwardly ensuring that the passage 148 is isolated from the second compartment 66a of the main chamber 60a. The variation of the pressure in the pipe 36 during anti-skid braking depends on the dimensions of the opening 144 and the resilience of the lip 124.

Again, when the wheel 10 associated with the distributor 34a returns to its normal dynamic state the electrovalve 32 is de-energised and the composite shutter 114 can return to its initial position permitting communication between the first and second ports 50, 52 of the distributor, the third port 50 being isolated by the electrovalve 32.

What is claimed is:

1. In a fluid operated motor vehicle braking system for at least two wheels of one axle of the vehicle, of the type comprising
    main braking pressure generating means,
    means for applying braking pressure from said main braking pressure generating means to brake actuators of both wheels of said axle for simultaneous braking of said two wheels of said axle,
    auxiliary braking pressure generating means, and
    means for applying a reduced braking pressure generated by said auxiliary braking pressure generating means to one of said wheels of said axle if its dynamic state approaches a skid or incipient skid state, while continuing to apply the full braking pressure to the other wheel of said axle if it is not in a skid or an incipient skid state,
    the improvement wherein:
    said means for applying a reduced braking pressure generated by said auxiliary braking pressure generating means comprises:
    distribution means associated with each wheel of said axle, said distribution means including,
    an electrovalve,
    a distributor,
    a first port of said distributor connected to said main braking pressure generating means,
    a second port of said distributor connected to a brake pipe leading to the brake actuator of an associated wheel of said axle,
    a third port of said distributor connected to a conduit leading to said auxiliary braking pressure generating means,
    a main chamber of said distributor,
    a main valve shutter slidingly housed in said main chamber and separating said main chamber into first and second compartments said first compartment communicating with both said first and said second ports,
    means defining a first communication passage leading from said second compartment to said electrovalve,
    means defining a second communication passage leading from said third port to said electrovalve,
    a valve shutter of said electrovalve controlling communication between said first communication passage and said second communication passage whereby to close communication between said third port and said second compartment of said main chamber when said electrovalve is in a first operating position and to open such communication when said electrovalve is in a second operating position, said main shutter being displaced by pressure in said second compartment of said main chamber when said electrovalve is in said second operating position whereby to close communication between said first and said second ports and to open communication between said third and said second ports.

2. A braking system as in claim 1, wherein said main shutter is made of resilient material, in the form of a truncated cone, having larger and smaller end faces which respectively face said first compartment and said second compartment of said main chamber, an annular groove in said larger end face of said main shutter defining a resilient peripheral lip which permits fluid to flow from said second compartment to said first compartment of said main chamber but which prevents the flow of fluid from said first to said second compartment.

3. A braking system as in claim 1, wherein said main shutter is a composite shutter comprising first and second main shutter parts each being made of resilient material and being in the form of a truncated cone, an annular groove in the larger end face of each of said first and second main shutter parts, defining a resilient peripheral lip, said two main shutter parts being orientated such that their larger end faces are facing one another, a first central rigid core insert housed in said first main shutter part, a second central rigid core housed in said second main shutter part, axial projections extending from the adjacent faces of said first and second central rigid core inserts, said axial projections interengaging one another to hold said first and second shutter parts spaced from one another, means defining an axial aperture in said first core insert and means defining a radial opening in one of said first and second core inserts whereby said space between said first and second shutter parts communicates with said axial aperture in said first core insert of said first shutter part.

4. A braking system as in claim 1, wherein said second communication passage between said third port and said electrovalve has a cross-sectional area substantially less than that of said first and second ports.

5. A braking system as in claim 1, wherein the cross sectional area of said second communication passage between said third port and said electrovalve is in the region of 1/15 of the cross-sectional area of said first and second ports.

* * * * *